United States Patent
Dietrich

(10) Patent No.: US 10,224,839 B2
(45) Date of Patent: Mar. 5, 2019

(54) POWER SWITCH FOR MOTORIZED POOL VACUUM

(71) Applicant: Dan Dietrich, Delray Beach, FL (US)

(72) Inventor: Dan Dietrich, Delray Beach, FL (US)

( * ) Notice: Subject to any disclaimer, the term of this patent is extended or adjusted under 35 U.S.C. 154(b) by 310 days.

(21) Appl. No.: 15/043,054

(22) Filed: Feb. 12, 2016

(65) Prior Publication Data
US 2016/0237709 A1     Aug. 18, 2016

Related U.S. Application Data

(60) Provisional application No. 62/115,346, filed on Feb. 12, 2015.

(51) Int. Cl.
| | | |
|---|---|---|
| *E04H 4/16* | (2006.01) |
| *H02P 3/08* | (2006.01) |
| *H02P 1/22* | (2006.01) |
| *H02P 29/024* | (2016.01) |

(52) U.S. Cl.
CPC ............. *H02P 3/08* (2013.01); *E04H 4/1636* (2013.01); *H02P 29/0241* (2016.02)

(58) Field of Classification Search
CPC ......... H02P 3/08; H02P 29/024; E04H 4/1636
USPC .......................................................... 15/1.7
See application file for complete search history.

(56) References Cited

U.S. PATENT DOCUMENTS

| | | | | |
|---|---|---|---|---|
| 5,768,734 | A * | 6/1998 | Dietrich ................ | E04H 4/1618 15/1.7 |
| 6,352,645 | B1 * | 3/2002 | Wilfong ................ | B01D 29/15 210/767 |
| 8,540,493 | B2 * | 9/2013 | Koehl ................ | F04D 15/0088 417/43 |
| 2007/0094817 | A1 * | 5/2007 | Stoltz .................... | E04H 4/1636 15/1.7 |
| 2008/0236628 | A1 * | 10/2008 | Horvath ................ | E04H 4/1654 134/21 |
| 2013/0133144 | A1 * | 5/2013 | Erlich ................... | E04H 4/1654 15/1.7 |

* cited by examiner

*Primary Examiner* — Weilun Lo
(74) *Attorney, Agent, or Firm* — Robert M Downey PA

(57) ABSTRACT

A smart power switch for a swimming pool vacuum having a battery powered motor for driving a propeller within a vacuum head to create thrust and suction; the power switch including a microprocessor combined with two integrated motor-driver integrated circuits for driving the motor at different speeds and for detecting and clearing motor jams. Red, green and blue LED indicators notify the user of the state of the motor and motor driver. The microprocessor detects spikes in motor current to determine a motor jam and operates the motor driver to control the motor, including stopping and reversing the motor, to clear an obstruction in the vacuum head.

6 Claims, 5 Drawing Sheets

POWER SWITCH FOR MOTORIZED POOL VACUUM

This non-provisional patent application is based on provisional patent application No. 62/115,346 filed on Feb. 12, 2015.

BACKGROUND OF THE INVENTION

Field of the Invention

The present invention relates to a power switch for a swimming pool vacuum and, more particularly, to a smart power switch that uses a microprocessor to detect and clear motor jams in the vacuum head.

Discussion of the Related Art

The present invention relates to a swimming pool vacuum known commercially as the HAMMER-HEAD, as disclosed in my U.S. Pat. No. 5,768,734, the contents of which are fully incorporated herein by reference. The HAMMER-HEAD is a high performance pool cleaning tool powered by a high capacity rechargeable 12V battery. Previous versions of the Hammer-Head pool vacuum used a simple heavy duty switch to apply battery power to the motor. While easy to assemble, this setup has some disadvantages. First, the previous HAMMER-HEAD pool vacuums could only route battery power directly to the motor, providing one speed. Second, if the motor was jammed by a large object in a pool then the battery would be essentially shorted across the motor causing increased power drain until the user turned off the switch. If a user tried to unjam the motor in a previous model, without first turning the switch off, the motor would immediately begin spinning posing a safety issue.

SUMMARY OF THE INVENTION

The present invention is directed to a new power switch for the HAMMER-HEAD pool vacuum. This new power switch features high and low speed settings and intelligent motor jam detection. The new power switch will still sit between the battery and the motor, but uses a microprocessor and high power MOSFETs (metal-oxide-semiconductor field-effect transistors) to provide the high and low speeds. A marine rocker switch turns the microprocessor on and allows current to flow through the MOSFETs and to the motor. Because the rocker switch is used to power the microprocessor, all power flows through the MOSFETs themselves (except for the negligible current required to power the circuit) which reduces power loss.

The rocker switch is also used to select between high and low speed. When operating the HAMMER-HEAD pool vacuum, the user can quickly turn the switch off and back on (approximately ½ to ¾ of a second). The microprocessor detects this switching action, and toggles between high and low speeds. High speed is simply full DC power to the motor and will perform like the previous simple switch on prior versions of the HAMMER-HEAD pool vacuum. Low speed is realized using pulse width modulation (PWM) of the motor power. Using PWM allows the HAMMER-HEAD vacuum to consume up to 20% less battery power, with negligible reduction in performance. High speed is signified in the switchbox by solid (i.e., non-flashing) green LEDs, while low speed is signified by flashing green LEDs.

The new power switch uses an extremely low value series resistor to measure the current in the device. Voltages are sampled at each end of the current sense resistor and the voltage difference is translated into motor current. The microprocessor continuously samples this measurement in order to detect a spike in current due to the motor being jammed. When a jam is detected, the power to the motor will be reversed in order to "spit out" whatever is jamming the motor. If the motor is still jammed after three tries, the microprocessor will cut power to the motor and flash red LEDs to notify the user of the problem. If the user tries to unjam the motor before turning off the switch, the motor will not begin spinning until the power switch (i.e., switchbox) is reset offering an extra level of safety. The power switch has reverse polarity protection. Thus, if someone hooks up the battery backwards, it will not run.

BRIEF DESCRIPTION OF THE DRAWINGS

For a fuller understanding of the nature of the present invention, reference should be made to the following detailed description taken in conjunction with the accompanying drawings in which.

Like reference numerals refer to like parts throughout the several views of the drawings.

DETAILED DESCRIPTION OF THE PREFERRED EMBODIMENTS

Figure 1:
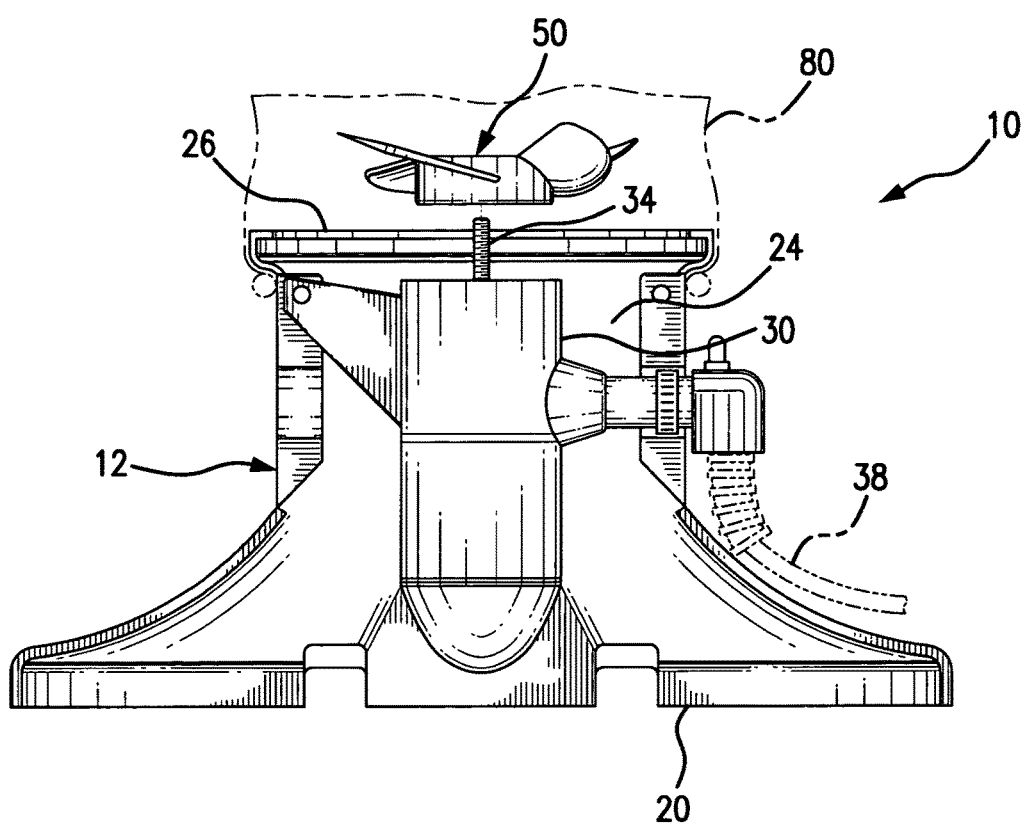
FIG. 1 is a front elevation of a halve of a housing of a swimming pool vacuum head showing a motor and propeller supported within an interior thrust channel of the vacuum head housing.
Figure 2:
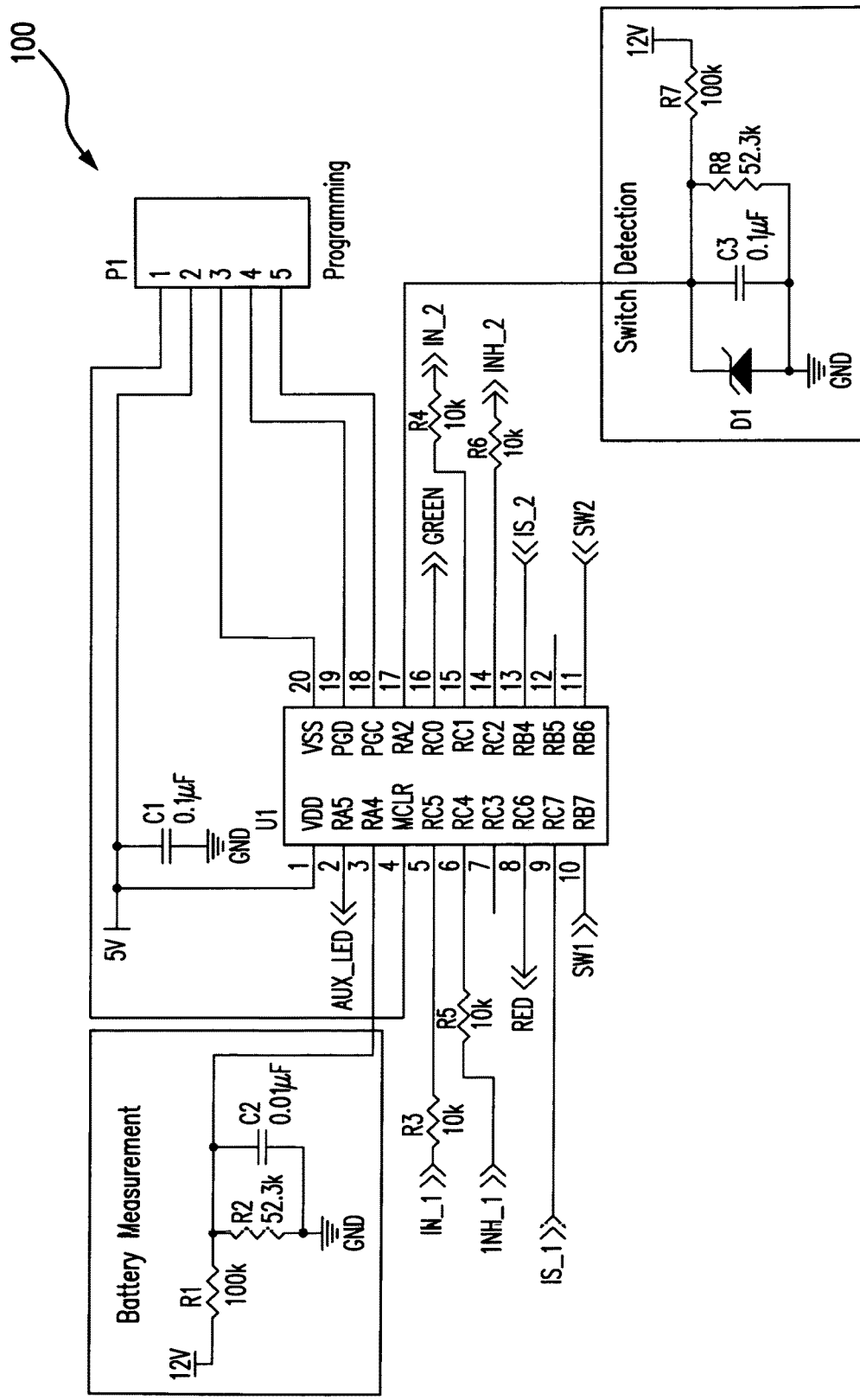
FIG. 2 is a schematic diagram of a microcontroller section of the power switch of the present invention.
Figure 3:
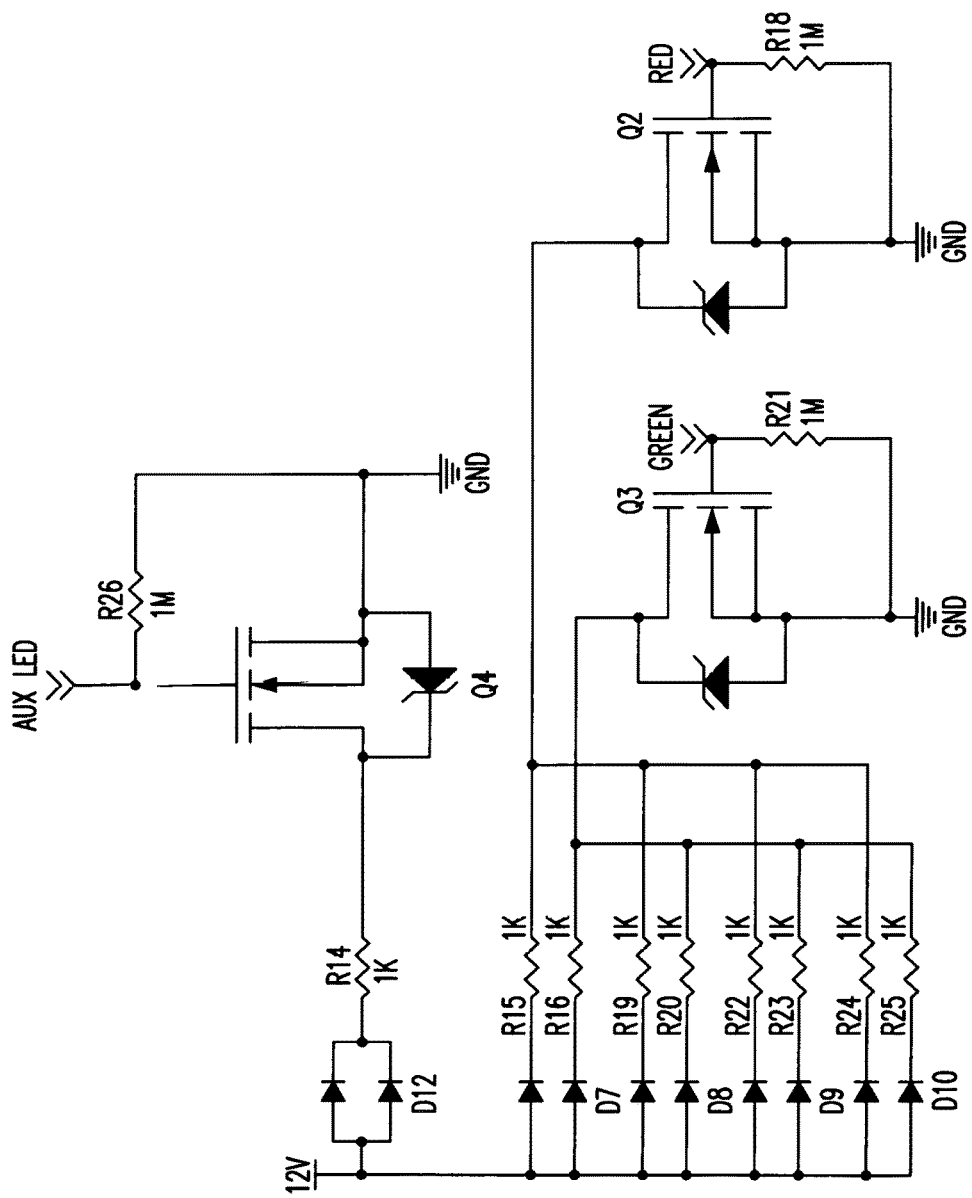
FIG. 3 is a schematic diagram of LED indicators of the power switch.
Figure 4:
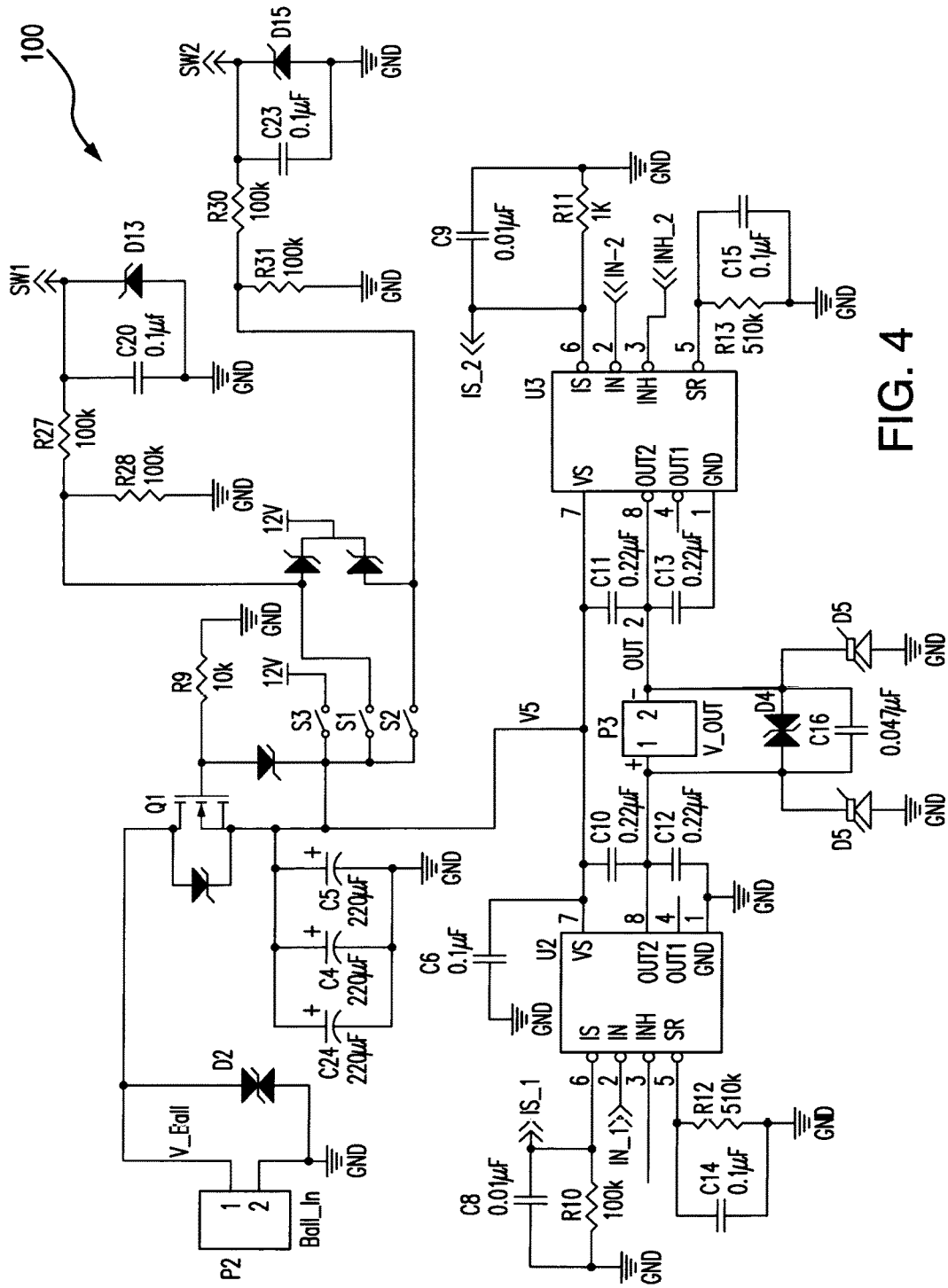
FIG. 4 is a schematic diagram illustrating a power section of the smart power switch of the present invention.
Figure 5:
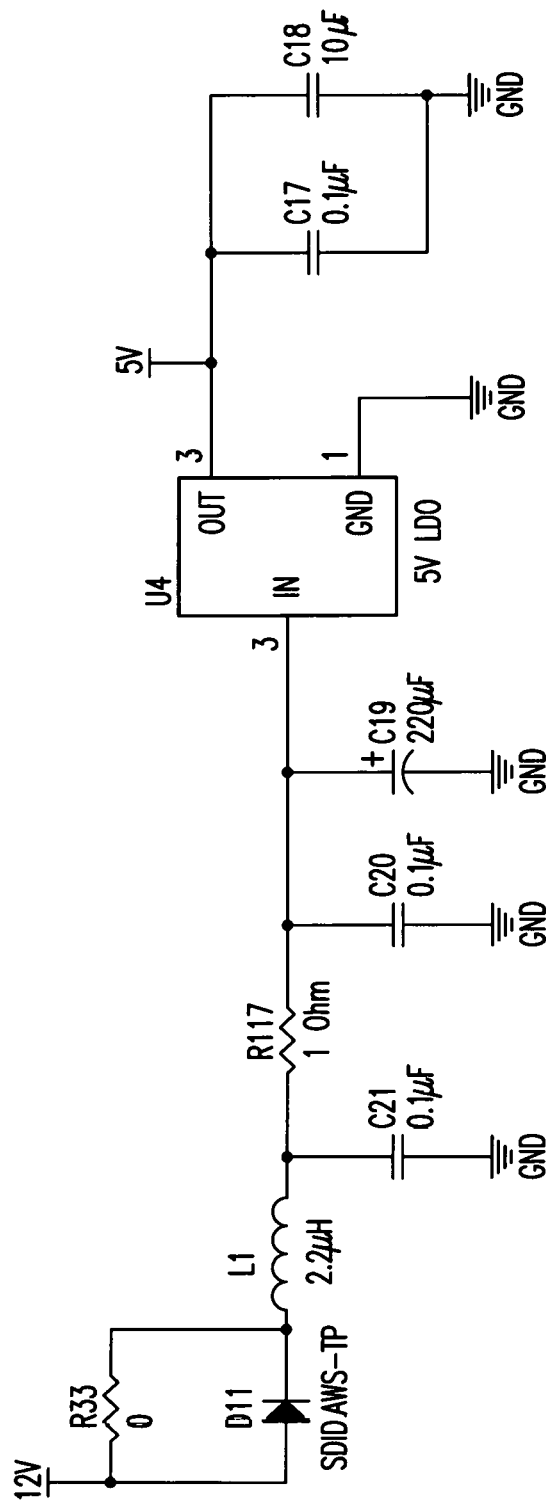
FIG. 5 is a schematic diagram of a power storage circuit for powering the microcontroller of the smart power switch.

Referring initially to FIG. 1, a swimming pool vacuum head assembly 10 is shown and includes a housing 12 with an electric motor unit 30 supported therein. The smart power switch 100 (see FIGS. 2-5) of the present invention is used to drive the battery powered electric motor unit 30 at different speeds, and also to detect and clear motor jams, as described in more detail hereinafter. The electric motor unit 30 has an axial shaft 34 that is rotatably driven by the motor unit 30. The motor unit 30 is powered by 12 volt battery power via an electrical conductor 38. A propeller 50 of predetermined pitch is fitted to the shaft 34 extending from the motor unit 30 and is rotatably driven upon activation of the motor unit 30.

Upon activation of the motor unit 30, the propeller 50 is driven (i.e., rotated) to create a thrust through a thrust channel 24 within the housing 12, causing suction at the vacuum mouth 20. In use, debris is drawn through the vacuum mouth 20, through the thrust channel 24, and into an attached catch bag 80 fitted over the discharge opening 26 of the housing 12.

A jammed object within the thrust channel 24 and propeller 50 can prevent rotation of the propeller 50 or significantly slow the propeller speed. As noted above, this jamming of the propeller will cause an increased power drain and can result in damage to the propeller 50, the motor unit 30 and possibly the battery. If the obstruction is not cleared, and power continues to be supplied to the motor, the motor can burn out.

The smart power switch 100 of the present invention overcomes the problem of objects being jammed within the motor (i.e., propeller) of the vacuum head.

Referring to FIGS. 2-5, the smart power switch 100 uses a microprocessor U1 combined with two integrated motor-driver integrated circuits, U2 and U3, to drive a battery powered motor (battery input at P2) at different speeds via pulse width modulation (PWM), and to detect and clear motor jams. The two motor-driver ICs form an H-Bridge that can drive the motor in either direction. The smart switch has red and green LED indicators (D7, D8, D9, and D10) on-board to notify the user of the state of the motor and motor driver. The smart switch is protected against reverse battery polarity in case of user error by a P-Channel MOSFET (Q1) at the input to the circuit. The integrated motor-driver ICs output an analog voltage in proportion to the electric current flowing through the motor. The microcontroller uses its internal analog-to-digital converter (ADC) to read this voltage and determine the state of the motor.

A sharp spike in motor current, followed by a steady high current value will indicate that the motor has stalled—typically due to an external obstruction. Current spikes not followed by a steady high current value are normal changes in motor load. When the microcontroller detects the stall condition, it will perform a "stutter"—that is, it will stop driving the motor for a short period of time in order to clear the jam. If this stutter is unsuccessful and the motor is still jammed, the microcontroller reverses the motor direction to clear the obstruction. After two unsuccessful reverse attempts, the microcontroller shuts the motor down and notifies the user via the LED indicators that the motor is jammed and has been shut down. The smart switch can also detect when the motor is not under load, and will shut the motor down after a period of time in order to protect the motor.

The smart switch measures the voltage of the user's battery, and can shut the motor down if the battery voltage falls too low. The user switches motor speeds by turning the main rocker switch (S3) off and back on in a short time frame (typically less than one second). The microcontroller detects this switch and changes the PWM duty cycle to change the motor's speed. During the time the switch is off, the microcontroller is powered by energy stored in a large electrolytic capacitor (C19), and the motor operation is unaffected until the microcontroller loses power. In lieu of a marine-style rocker switch, the smart switch may be activated by a magnetic switch (S1 and S2). The smart switch can also have a blue indicator LED (D12) for troubleshooting and fault-detection purposes.

While the present invention has been shown and described in accordance with a preferred and practical embodiment thereof, it is recognized that departures from the instant disclosure are fully contemplated within the spirit and scope of the present invention which is not to be limited, except as defined in the following claims.

What is claimed is:

1. A swimming pool vacuum apparatus comprising:
a vacuum head including a vacuum housing surrounding an interior thrust channel between a bottom open mouth and a top discharge opening structured for attachment of a catch bag thereto;
an electrically powered motor supported within the thrust channel of the vacuum housing and having a propeller fitted thereto, and the motor being structured and disposed for driving rotation of the propeller in a first direction to create an upward thrust force through the thrust channel, and the motor being further structured and disposed for driving rotation of the propeller in an opposite second direction to create a reverse direction thrust force downwardly through the thrust channel; and
a smart power switch between an electric power source and the motor for controlling operation of the motor and driven rotation of the propeller at different speeds and in both the first direction and the opposite second direction, and the smart power switch including two integrated motor-driver integrated circuits including a first motor-driver integrated circuit and a second motor-driver integrated circuit, the two integrated motor-driver integrated circuits forming an H-bridge for driving the motor in both the first direction and the opposite second direction, and the two integrated motor-driver integrated circuits being structured and disposed for outputting an analog voltage in proportion to the electric current flowing through the motor, and the smart power switch further including a microprocessor having an internal analog-to-digital converter for reading the output analog voltage of the two integrated motor-driver integrated circuits for determining an operational state of the motor, and wherein a steady increase in the output analog voltage indicates an obstruction against rotation of the propeller, and the smart power switch controlling the first and second integrated motor-driver integrated circuits to operate the motor and rotation of the propeller upon detecting an obstruction in order to clear the obstruction with the propeller.

2. The apparatus as recited in claim 1 wherein the smart power switch controls operation of the motor and driven rotation of the propeller at different speeds via pulse width modulation.

3. The apparatus as recited in claim 2 wherein the smart power switch comprises multiple color LED indicators for notifying the user of the state of the motor and integrated motor-driver circuits.

4. The apparatus as recited in claim 3 wherein the microprocessor is structured to stop and start rotation of the motor in response to detecting an obstruction of rotation of the propeller.

5. The apparatus as recited in claim 4 wherein the microprocessor is structured and disposed to operate the motor in the second direction in response to detecting an obstruction of rotation of the propeller.

6. The apparatus as recited in claim 5 wherein the microprocessor is structured and disposed to stop operation of the motor in response to detecting an obstruction of rotation of the propeller.

* * * * *